United States Patent
Skibinski et al.

(10) Patent No.: US 6,654,798 B1
(45) Date of Patent: Nov. 25, 2003

(54) AUTOMATIC CONTACT DISTRIBUTION SYSTEM DEFINABLE AGENT LOG-OFF REASONS

(75) Inventors: Jeffrey J. Skibinski, Naperville, IL (US); Robert T. Eitel, Bartlett, IL (US); James Lewis Beck, III, Orland Park, IL (US); Daniel F. Baker, Rolling Meadows, IL (US)

(73) Assignee: Rockwell Electronic Commerce Technologies LLC, Wood Dale, IL (US)

( * ) Notice: Subject to any disclaimer, the term of this patent is extended or adjusted under 35 U.S.C. 154(b) by 727 days.

(21) Appl. No.: 09/611,611

(22) Filed: Jul. 7, 2000

(51) Int. Cl.[7] .............................................. G06F 15/177
(52) U.S. Cl. ........................ 709/220; 709/202; 713/200
(58) Field of Search ................................ 709/220, 221, 709/202, 203; 713/200, 201, 202; 379/265.09; 370/352

(56) References Cited

U.S. PATENT DOCUMENTS

| | | | |
|---|---|---|---|
| 5,140,611 A | 8/1992 | Jones et al. ..................... 375/7 |
| 5,268,903 A | 12/1993 | Jones et al. ............... 370/110.1 |
| 5,335,269 A | 8/1994 | Steinlicht ..................... 379/266 |
| 5,365,581 A | 11/1994 | Baker et al. ................. 379/196 |
| 5,400,327 A | 3/1995 | Dezonno ...................... 370/62 |
| 5,442,693 A | 8/1995 | Hays et al. |
| 5,815,566 A | 9/1998 | Ramot et al. |
| 5,943,478 A | * 8/1999 | Aggarwal et al. .......... 713/201 |
| 5,945,990 A | 8/1999 | Morrison et al. |
| 6,005,932 A | 12/1999 | Bloom ........................ 379/265 |
| 6,044,142 A | 3/2000 | Hammarström et al. |
| 6,493,447 B1 | * 12/2002 | Goss et al. ............. 379/265.09 |
| 6,604,138 B1 | * 8/2003 | Virine et al. ................. 709/224 |

* cited by examiner

*Primary Examiner*—Mehmet B. Geckil
(74) *Attorney, Agent, or Firm*—Welsh & Katz, Ltd.

(57) ABSTRACT

Method and apparatus for configuring agent log-off reasons in connection with an automatic contact distribution (ACD) system. An organization operating an ACD system can define any number of agent log-off reasons, which can be configured for individual agents, for groups of agents, or system-wide. These custom-defined reasons can be incorporated in historical reports and in real-time displays regarding schedule adherence. These custom-defined reasons can be changed at any time. In addition, the order in which the reasons appear for selection by an agent can be changed at any time, and can be reordered automatically in accordance with different algorithms.

34 Claims, 3 Drawing Sheets

AUTOMATIC CONTACT DISTRIBUTION SYSTEM DEFINABLE AGENT LOG-OFF REASONS

BACKGROUND AND SUMMARY

The present invention relates to configuring agent log-off reasons in connection with an automatic contact distribution (ACD) system.

ACD systems are typically used to distribute telephone calls and other customer contacts among a group of agents of an organization. In general, ACD systems may be used to distribute contacts under any of a number of different formats. For example, a contact may be a telephone call received from (or placed through) a public switched telephone network (PSTN) or a contact may be a voice path based upon packet data transferred through a computer network such as the Internet using web telephony. Alternatively, a contact may be any communication such as an e-mail, a facsimile, a video, or a web-site inquiry received through the Internet, etc. Thus, ACD systems are transaction processing systems which can handle one or more of a wide variety of these contact types.

An organization can disseminate a single telephone number, URL or e-mail address, for example, to customers and to the public in general as a means of contacting the organization. As contacts are directed to the organization, for example from the PSTN or the Internet, the ACD system can direct the contacts to the organization's agents based upon some algorithm. For example, where all agents are considered equal, the ACD may distribute a contact based on which agent has been idle the longest time. Of course, there are many other possible ways to select an agent, or a subgroup of agents from whom an available one will be selected.

The ACD system can be,provided with any number of routing mechanisms for establishing contact paths between agent stations and sources of contacts. In some systems, a path may be established through a circuit switched voice port, such as for calls from the PSTN. Another path may be a data link (such as over a Local Area Network (LAN)) such as, for example, for an e-mail received through a computer network such as the Internet.

Control of the switching and communications with a database and with an external network such as a PSTN may, for example, be accomplished generally as described in U.S. Pat. Nos. 5,268,903 and 5,140,611, both to Jones et al. which are hereby incorporated by reference. Routing of contacts to agents may, for example, be accomplished generally as described in U.S. Pat. No. 5,335,269 to Steinlicht, U.S. Pat. No. 5,365,581 to Baker et al., and U.S. Pat. No. 5,400,327 to Dezonno, which are hereby incorporated by reference.

Some ACD systems will direct contacts only to agents who are "logged-on." That is, the system will not direct a contact to an agent station, if there is no agent present to handle contacts. Of course, the system still may not direct a contact to an agent who is logged on because, for example, the agent may be occupied with another contact at a given time. However, the agent would not even be potentially eligible to receive contacts if not logged-on. Other ACD systems do not require prior log-on. For example, another type of ACD system, especially suitable for but not limited to wireless phone and pager systems, will notify all agent stations associated with an agent being sought, regardless of the agent's log-on status. However, there still can be a logon/log-off procedure for management purposes.

An organization operating an ACD system needs the ability to track when and why its agents are logged-off. Therefore, it is desirable to have agents indicate a log-off reason which can be stored in conjunction with a record of the log-off. It is also desirable for agents to be able to indicate log-off reasons in a timely fashion.

One way to identify agent log-off reasons is to provide static log-off reasons such as Break, Lunch, EndDuty, Personal, Meeting, or Training, which can be displayed in a fixed order at an agent station in response to an agent log-off request. The agent can select one of the reasons provided for the information of a monitoring supervisor and for recording with a date/time entry. Another way is for the agent to enter a log-off reason code. There can be a system-wide log-off reason for each code.

In accordance with one embodiment of the present invention, an organization operating an ACD system obtains greater flexibility to define any number of agent log-off reasons, which may be tailored to particular agents, or which may be configured for groups of agents or for system-wide application. In various embodiments, these custom-defined reasons may be displayed in text to an agent, may be incorporated in historical reports and in real-time displays for monitoring supervisors, and/or may be integrated with existing work force management programs. The log-off reason may be communicated directly from an agent station to the ACD system, or via another computer which also performs other functions. These custom-defined reasons may be changed at any time. In addition, the order in which the reasons appear for selection by an agent may be changed at any time. Such reordering may be effected in accordance with different algorithms designed to optimize the order (i.e., reordering so that a reason which is expected to be the most likely reason appears first, and so forth).

The features of the present invention which are believed to be novel are set forth below with particularity in the appended claims. The invention, together with further advantages thereof, may be understood by reference to the following description in conjunction with the accompanying figures, which illustrate some embodiments of the invention.

DETAILED DESCRIPTION

In one embodiment, the present invention can provide an organization operating an ACD system with the flexibility to define specific log-off reasons whose text names may be displayed to the organization's agents in response to their respective log-off requests. The text names may be chosen with the desired specificity to facilitate correlation of an agent's actual activity and scheduled activity. The organization operating an ACD system may be provided with the flexibility to customize the list displayed to any particular agent, so that it includes all e of the reasons applicable to that agent, but does not include reasons which are not applicable to that agent. The order in which reasons are displayed may be changed, so that the reason which is expected to be the most likely reason will appear first, and so forth, minimizing the time necessary to complete the log-off process. The particular reasons and the order in which they are displayed may be changed at any time.

As mentioned above, the term "ACD system" is not limited to system distributing circuit switched telephone calls, or to a system in which the agents are located in any one place. As examples, the present invention may apply to agents working at remote locations including working at home, to agents in connection with an internet service provider dial-up service, to web access agents, to instant messenger agents, or to ICQ agents, etc.

Figure 1:
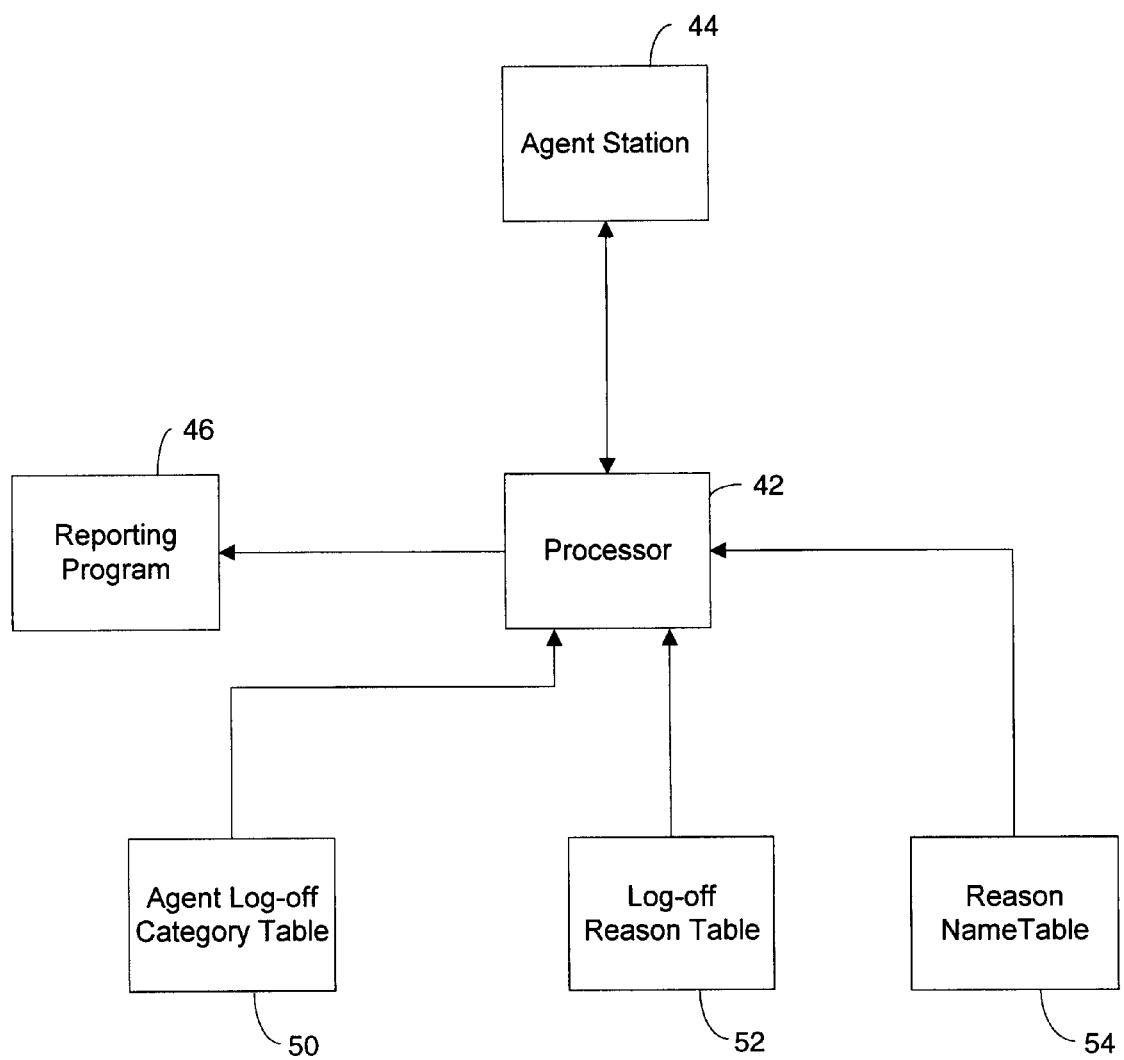
FIG. 1 is a block diagram illustrating an example of the relationship between system components in connection with one embodiment of the agent log-off process.
Figure 2:
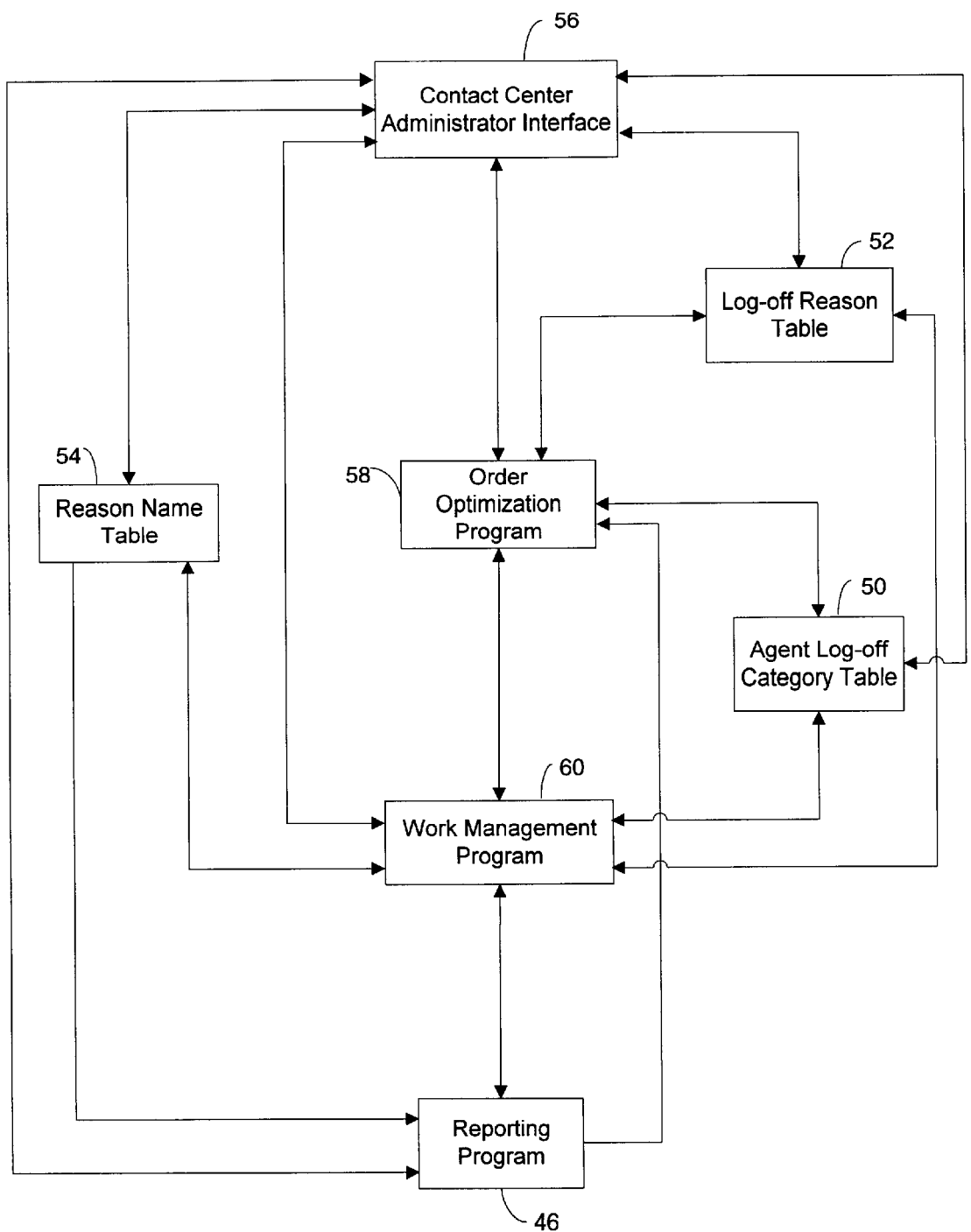
FIG. 2 is a block diagram illustrating an example of the relationship between system components in connection, with one embodiment of the process defining agent log-off reasons.

FIG. 1 is a block diagram illustrating an example of the relationship between system components in connection with one embodiment of the agent log-off process. In the example of FIG. 1, a processor 42 is in communication with an agent station 44, a reporting program 46, and several tables 50, 52, and 54. For example, agent station 44 could comprise a personal computer, and processor 42 could comprise a central processing unit of the ACD system controlling the routing of contacts to agents. It is understood that there could be many agent stations such as agent station 44 associated with an ACD system. After receipt of a log-off request from agent station 44, processor 42 obtains the list of log-off reasons to be displayed at agent station 44 by reference to the tables 50, 52, and 54. Upon display of the list of log-off reasons at agent station 44, the agent would select a log-off reason which would be communicated to processor 42. A record of the log-off may be communicated to a reporting program 46. FIG. 2 is a block diagram illustrating an example of the relationship between system components in connection with a specific embodiment of a process defining agent log-off reasons. In the example of FIG. 2, agent log-off category table 50 may list an agent log-off category code for every agent identifier. For example, each agent could be assigned to one agent log-off category, and each agent log-off category could be associated with specific log-off reasons to be displayed in a specific order. All agents could be in one log-off category if it is desired that every agent should be presented with the same list of log-off reasons in the same order. However, the agents could be divided into different log-off categories, or a log-off category might even include only a single agent.

As examples, categories may be chosen based on tasks being performed by an agent, physical location of an agent, work group to which an agent is attached within the organization operating the ACD system, supervisor to whom an agent reports, class of service (such as communication capabilities) assigned to an agent by the ACD system, contact media (such as web contacts, e-mail, circuit switched telephone calls, etc.) assigned to an agent, particular skills of an agent, application which an agent is servicing (such as sales inquiries, customer service inquiries, etc.), time period during which an agent is working, particular activities scheduled for an agent, or other desired bases.

In the example of FIG. 2; codes indicating specific log-off reasons, and the specific order in which they should be displayed, could be listed in log-off reason table 52 for every agent log-off category code. As an example, a certain agent could be involved in particular training or in a special project not applicable to other agents. A log-off category could be created for that agent which included the unique log-off reasons applicable to that agent. During the log-off process, each agent would see only the log-off reasons applicable to himself or herself.

In the example of FIG. 2, reason name table 54 could list the reason code and corresponding text name for every log-off reason applicable to any agent.

In one embodiment, lists corresponding with each log-off category code in log-off reason table 52 could include log-off reason codes for the applicable reasons, and respective ordering codes indicating the placement of each reason in the display to the agent. In another embodiment, lists corresponding with each log-off category code in table 52 could include just log-off reason codes arranged in the order in which the reasons should be displayed to the agent. In still another embodiment, lists corresponding with each log-off category code in table 52 need not list log-off reason codes. Instead, each list could include only an ordering code with an entry for each possible log-off reason in the order in which the reasons appear in the reason name table 54. The ordering codes could correspond with the order in which the reasons should be displayed, with a no-display code (such as "0") for reasons which should not be displayed.

In one embodiment, there could be a system parameter which defines the number and/or the maximum number of reasons which can be displayed to an agent. For example, this system parameter could be configurable so that, for example, the maximum number of reasons can be reconfigured at any time as desired. In another embodiment, such a parameter could be specific to a log-off category. That is, the number and/or the maximum number of reasons which can be displayed could be controlled separately for each log-off category.

In the example of FIG. 2, a contact center administrator may read from or write to agent log-off category table 50, log-off reason table 52, or reason name table 54 through a contact center administrator interface 56. In this sense, "contact center administrator" is used to label a person, in an organization operating an ACD system, who has the capability to change some of the system configuration. While not shown in FIG. 2, access to tables 50, 52, and 54 can be through a processor such as processor 42.

At any time, agent identifiers can be added to or deleted o from agent log-off category table 50, and the log-off category to which a particular agent is assigned can be changed. At any time, log-off category codes can be added to or deleted from log-off reason table 52, and the reason and order codes corresponding with each log-off category code can be changed. Log-off reasons can be added to or deleted from reason name table 54 at any time.

In one embodiment, any updates to tables 50, 52, or 54 could include automatic notification to processor 42 (in FIG. 1) and real-time substitution of any list of log-off reasons being displayed at an agent station 44.

Similarly, in the example of FIG. 2, a work management program 60 may download from or upload to tables 50, 52, and 54, either in addition to or in lieu of a contact center administrator. The contact center administrator may interact with work management program 60 through a contact center administrator interface 56. There are commercially available work management programs (such as Blue Pumpkin or IEX Corporation's Total View) which can assist in scheduling the activities of employees of an organization such as agents working in connection with an ACD system. For example, coordination is desirable to ensure that a sufficient number of agents are available to handle contacts in various areas of the business (e.g., sales inquiries, service inquiries, etc.), while also scheduling training, meetings, breaks, and so forth. Examples of a method and apparatus for scheduling agents and supporting operation of an ACD system are described in U.S. Pat. No. 6,005,932 to Bloom which is hereby incorporated by reference.

In one embodiment, there can be coordination between display of log-off reasons to an agent and such a work management program 60. For example, information and changes in information regarding scheduled activities and log-off reasons can be exchanged between a contact center administrator and a work management program 60 through a contact center administrator interface 56. As another example, a work management program 60 can automatically check for, and/or automatically be notified of, the log-off reasons and/or changes to the log-off reasons which will be displayed to at agent. Any changes in the log-off reasons to be displayed which may be desirable in view of the agent's schedule, may be initiated by the work management program 60 and/or by the contact center administrator through a contact center administrator interface 56. Such changes could include it deleting log-off reasons no longer applicable to a particular agent, or adding log-off reasons which have become applicable. This could include changing an agent's log-off category, or creating a new log-off category for that agent.

In different embodiments, a contact center administrator (via a contact center administrator interface 56) and/or a work management program 60 can reorder the log-off reasons which will be displayed to an agent. For example, there can be adjustment of codes, in the log-off reason table 52, specifying the order in which specific log-off reasons of a particular log-off category should be displayed. In the example of FIG. 2, an order optimization program 58 also may be used to select the order in which log-off reasons are displayed, based on a variety of criteria. The objective is to minimize the time which an agent takes to complete the log-off process, by displaying first a log-off reason which is expected to be the most likely reason, displaying second a reason expected to be the next most likely reason, and so forth.

Any number of algorithms can be devised to predict an optimal order in which to display log-off reasons. The following are merely some examples:

Log-off reasons may be displayed in the order in which they have been used most often over a 'specified period (such as in the last week, in the last month, in the last year, for all time, etc.). The log-off reason used most often may appear first the reason with the next highest use may appear second, and so forth. The frequency of use may be measured among only agents in a particular log-off category, among all agents, or among some other grouping of agents.

Alternatively, log off reasons may be displayed in the order in which they have been used most recently. The last log-off reason used may appear first, the reason used next most recently may appear second, and so forth. The recency of use may be measured among only agents in a particular log-off category, among all agents, or among some other grouping of agents. For example, if a reason is expected to be commonly selected by a group of agents upon occurrence of a certain activity, then that reason could be listed first for every agent in the group as soon as it is selected by any agent in the group.

Log-off reasons also may be displayed in an order based on the agent's defined schedule. For example, the next scheduled log-off activity may appear first, and so forth. This algorithm is particularly suitable for coordination with a work management program 60. In one embodiment, there can be a feedback mechanism. Actual reasons selected may be considered not only to reorder the log-off reasons displayed to an agent, but to plan the agent's scheduled activities.

As another example, log-off reasons may be displayed in an order based on the time of the log-off request during an agent's work shift. For example, an end of duty reason may be expected to occur at the end of a shift, a lunch break reason may be expected in the middle, perhaps a training reason may be expected early in a shift on Fridays, and so forth.

In one embodiment, the particular order optimization algorithm executed can vary depending on a factor such as the agent's work group. The algorithm to be applied could be a separate attribute for each agent log-off category.

In the example of FIG. 2, order optimization program 58 may download from and upload to agent log-off category table 50 and log-off reason table 52 and may interact with work management program 60 and with a contact center administrator via contact center administrator interface 56. It also may acquire information from a reporting program 46 (or from a portion of memory in which data operated on by reporting program 46 is stored).

In other embodiments, the data in tables 50, 52, and 54 could be organized differently. For example, tables 52 and 54 could be combined, with log-off reason table 52 using a text name instead of a code for a log-off reason. For example, tables 50 and 52 could be combined, with log-off reason codes listed for each agent identifier even if the list was the same as for another agent. Similarly, tables 50, 52, and 54 could be combined in a single table. In another example, agent log-off category table 50 could be part of a larger collection of data regarding each agent.

In some embodiments, the table 50 is not included. For example, in an embodiment in which the same log-off reasons are always displayed to each agent, there is no need for table 50. In that embodiment, log-off reason table 52 could include the log-off reason codes for the reasons which will be displayed. The reason codes included in table 52 and their ordering may be subject to real-time modification. In one example, any modification in the reasons to be displayed can be reflected immediately by real-time substitution of any list of log-off reasons being displayed at an agent station 44, as mentioned above.

In one embodiment, the reason ordering could occur separately instead of being incorporated in a log-off reason table 52. For example, order optimization program 58 could be applied after log-off reasons for a particular agent were read from table 52, but before they were displayed to the agent.

Figure 3:
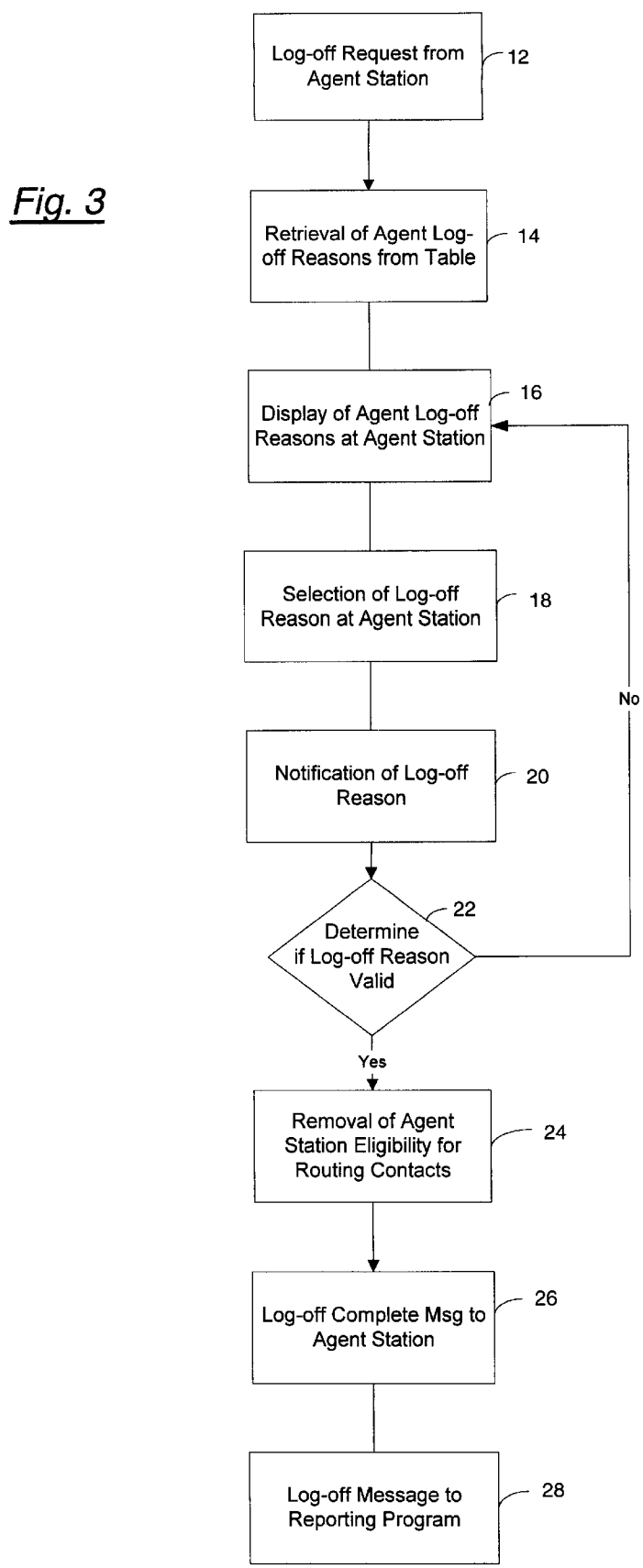
FIG. 3 is a functional block diagram illustrating an example of one embodiment of the agent log-off process.

FIG. 3 is a functional block diagram illustrating an example of a specific embodiment of the agent log-off process. In the example of FIG. 3, an agent could initiate a log-off request 12 which, in the illustrated embodiment of FIG. 1, would be sent from agent station 44 to processor 42. There then could be retrieval 14 of log-off reasons defined for the particular agent.

In one embodiment, the log-off request 12 would automatically include an agent identifier. In other embodiments, processor 42 would have to access information, about the agent identifier currently associated with agent station 44, which had been stored as part of an initialization process when the agent logged on.

In one embodiment, an agent log-off category code corresponding with the particular agent identifier could be determined by processor 42 from table 50. Codes indicating specific log-off reasons and the specific order in which they should be displayed could be determined from log-off reason table 52 for the particular agent log-off category. The text name of particular log-off reasons could be determined from reason name table 54, completing the retrieval 14 of log-off reasons defined for the particular agent. Different embodiments could involve different tables, as discussed above.

Continuing with the example of FIG. 3, a display 16 of the text names of the log-off reasons defined for the particular agent could be presented at agent station 44 in the defined order. Agent selection 18 of an applicable log-off reason could be effected at agent station 44, generating notification 20 of the log-off reason from agent station 44 to processor 42. In one embodiment, processor 42 could make a determination 22 whether the signal received from agent station 44 represented a valid log-off reason. If note there could be redisplay 16 of log-off reasons at agent station 44. This situation might arise because of a computer error, an error by the agent, or because of an intervening change of available log-off reasons.

If a determination 22 is made that there was selection 18 of a valid log-off reason (or if there is no such validation determination 22), processor 42 could execute removal 24 of the eligibility of agent station 44 for the routing of contacts. For example, default values could be restored to a selected portion of memory which was assigned to agent station 44 when the agent logged on, rendering that portion of memory available for another assignment.

In one embodiment, there could be acknowledgement of the log-off with a log-off complete message 26 from processor 42 to agent station 44. In one embodiment, a log-off message 28 could be sent from processor 42 to a reporting program 46. For example, a log-off message 28 to a reporting program 46 could generate recordation of the agent identifier, log-off reason, and date/time.

In an alternative embodiment, notification 20 of the selected log-off reason could be sent from agent station 44 to processor 42 via another computer (not shown). In different examples, other events described above (such as retrieval 14 of log-off reasons, log-off complete message 26, or log-off message 28 to reporting program 46) also could be accomplished wholly or in part by another computer rather than wholly by ACD processor 42.

The other computer could perform myriad other functions for the organization operating the ACD system rand, in one example, could be used by the organization operating the ACD system to control the ACD system. In some examples, a separate host computer could effect data transmission to and from agent station 44. As one example, this could be database information which an agent needs in connection with a particular contact. As another example, this could be the content of a non-telephone circuit switched contact, such as an e-mail or a web inquiry. In other words, processor 42 controls the routing of contacts to agents and is part of the agent log-off process. However, in some embodiments, at least part of the process of displaying and recording log-off reasons could be performed by another computer.

In one embodiment, there can be default log-off reasons displayed to an agent if a customized list is not stored for the agent. In other embodiments, display of log-off reasons can be an event which is available, but is executed during a log-off procedure only if activated. For example, there can be an option, exercised by the contact center administrator, whether log-off reasons are to be displayed or are to be required to complete the log-off process. As another example, the display of log-off reasons could be an alternative provided if a log-off request 12 were sent from an agent station 44 in lieu of, or without accompaniment by, a log-off reason code.

Reporting program 46 can facilitate the presentation of real-time displays (for example, on a computer monitor of a supervisor) and/or historical reports. This can be used not only to monitor agent activity in general, but in particular to compare actual agent activity to scheduled activity. For example, actual log-off;reasons can be compared with scheduled activities in conjunction with a work management program 60 or in conjunction with a commercially available schedule adherence program such as Rockwell's Call Center Commander.

In the examples of FIGS. 1 and 3, reporting program 46 can receive actual log-off messages 28 from processor 42. In the example of FIG. 2, reporting program 46 can determine text names corresponding with log-off reason codes from reason name table 54, and can interact with work management program 60 and with a contact center administrator via a contact center administrator interface 56. The feedback from reporting program 46 can be used in general for efficient management of a contact center, and specifically to modify and reorder log-off reasons which will be displayed to an agent in response to a log-off request.

The present invention provides an organization operating an ACD system greater flexibility in tailoring log-off reasons for groups of agents or even for individual agents. It provides the optional advantages of being able to tailor reports and real-time displays (such as those connected with schedule adherence programs) with as much specificity as desired. It is more efficient for agents in that text names for log-off reasons are displayed, only reasons applicable to a particular agent need be displayed, and the display can be arranged so that the most likely reason is displayed first and so forth. The present invention also provides greater flexibility, because log-off reasons and the order in which log-off reasons are displayed can be changed at any time.

The embodiments discussed and/or shown in the figures are examples. They are not exclusive ways to practice the present invention, and it should be understood that there is no intent to limit the invention by such disclosure. Rather, it is intended to cover all modifications and alternative constructions and embodiments that fall within the scope of the invention as defined in the following claims:

What is claimed is:

1. A method for configuring agent log-off reasons in connection with an automatic contact distribution system on a real-time basis, the method comprising:
   defining a configurable set of agent log-off reasons adapted for display as part of an agent log-off procedure;
   redefining the set of reasons on a real-time basis whenever desirable; and
   displaying the most recently defined set of agent log-off reasons at an agent station after receipt of a log-off request from the agent station.

2. The method as in claim 1, further comprising defining a set of agents to whom the set of agent log-off reasons will apply.

3. The method as in claim 2, wherein the set of agents is configurable, and the step of defining the set of agents can be performed as often as desirable, redefining the set of agents on a real-time basis.

4. The method as in claim 2, the set of agents being selected from a group consisting of: all agents working with the system, an individual agent, a plurality of individual agents, a category of agents, a category of agents based on agent tasks, a category of agents based on agent location, a category of agents based on agent work group, a category of agents based on agent supervisor, a category of agents based on agent assigned class of service, a category of agents based on agent skills, a category of agents based on agent provided services, a category of agents based on agent work time period, and a category of agents based on scheduled agent activities.

5. The method as in claim 1, further comprising setting a configurable parameter on a real-time basis for a maximum number of members of the set of agent log-off reasons.

6. The method as in claim 1, further comprising defining a configurable order in which members of the set of agent log-off reasons are to be displayed, wherein the order defining step can be performed as often as desirable, redefining the order on a real-time basis.

7. The method as in claim 6, wherein the order defining step uses feedback regarding log-off reasons actually selected historically in determining the order in which the members of the set of agent log-off reasons are to be displayed.

8. The method as in claim 6, the order in which the members of the set of agent log-off reasons are to be displayed being selected from a group consisting of: a same order for every agent, an individual order for at least one agent, a group order for a group of agents, an order in which the reasons have been used most often by an agent to whom the set of reasons is to be displayed, an order in which the reasons have been used most often among a category of agents which includes the agent to whom the set of reasons is to be displayed, an order in which the reasons have been used most often among all agents working with the system, an order in which the reasons have been used most recently by the agent to whom the set of reasons is to be displayed, an order in which the reasons have been used most recently among a grouping of agents which includes the agent to whom the set of reasons is to be displayed, an order in which the reasons have been used most recently among all agents working with the system, an order correlated with scheduled activities of the agent to whom the set of reasons is to be displayed, an order specified by a person, an order specified by a software program facilitating scheduling of agent activities, and an order correlated with a time of the log-off request during a work shift of the agent to whom the set of reasons is to be displayed.

9. The method as in claim 1, further comprising:
   selecting a log-off reason from the set of log-off reasons displayed at the agent station; and
   displaying the selected log-off reason on a real-time basis.

10. The method as in claim 1, the method further comprising:
    selecting a log-off reason from the set of log-off reasons displayed at the agent station; and
    storing a record of the selected log-off reason.

11. The method as in claim 1, the method further comprising storing a collective record of selected log-off reasons, the collective record including a date/time entry for each log-off with a corresponding agent identifier and log-off reason.

12. The method as in claim 1, the method further comprising:
    selecting a log-off reason from the set of log-off reasons displayed at the agent station; and
    comparing the selected log-off reason with a scheduled activity of an agent identified as working at the agent station.

13. An apparatus for configuring agent log-off reasons in connection with an automatic contact distribution system on a real-time basis, the apparatus comprising:
    an agent station;
    means for defining a configurable set of agent log-off reasons adapted for display as part of an agent log-off procedure, wherein the set of reasons can be redefined on a real-time basis; and
    means for displaying the most recently defined set of agent log-off reasons at the agent station after receipt of a log-off request from the agent station.

14. The apparatus as in claim 13, further comprising means for defining a set of agents to whom the set of agent log-off reasons will apply.

15. The apparatus as in claim 14, wherein the set of agents is configurable, and the set of agents can be redefined on a real-time basis.

16. The apparatus as in claim 14, the set of agents being selected from a group consisting of: all agents working with the system, an individual agent, a plurality of individual agents, a category of agents, a category of agents based on agent tasks, a category of agents based on agent location, a category of agents based on agent work group, a category of agents based on agent supervisor, a category of agents based on agent assigned class of service, a category of agents based on agent skills, a category of agents based on agent provided services, a category of agents based on agent work time period, and a category of agents based on scheduled agent activities.

17. The apparatus as in claim 13, further comprising means for defining a configurable order in which members of the set of agent log-off reasons are to be displayed, wherein the order can be redefined on a real-time basis.

18. The apparatus as in claim 13, further comprising:
    means for selecting a log-off reason from the set of log-off reasons displayed at the agent station; and
    means for displaying the selected log-off reason on a real-time basis.

19. The apparatus as in claim 13, further comprising:
    means for selecting a log-off reason from the set of log-off reasons displayed at the agent station; and
    means for storing a record of the selected log-off reason.

20. The apparatus as in claim 13, further comprising means for storing a collective record of selected log-off reasons, the collective record including a date/time entry for each log-off with a corresponding agent identifier and log-off reason.

21. The apparatus as in claim 13, further comprising:
    means for selecting a log-off reason from the set of log-off reasons displayed at the agent station; and
    means for comparing the selected log-off reason with a scheduled activity of an agent identified as working at the agent station.

22. An apparatus for configuring agent log-off reasons in connection with an automatic contact distribution system, the apparatus comprising:
    memory adapted to store a list of agent log-off reasons which apply to a set of agents;
    an agent station, including a computer display screen capable of displaying the list of log-off reasons; and
    one or more processors, wherein at least one processor is configured to execute changes to the list of agent log-off reasons stored in the memory, and wherein at least one processor is configured to send the list of log-off reasons to the agent station after receipt of a log-off request from the agent station.

23. The apparatus as in claim 22,
    wherein at least one processor is configured to execute changes to the set of agents, and
    wherein the at least one processor configured to send the list of log-off reasons to the agent station is configured to send the list to the agent station if an agent identified as working at the agent station is among the set of agents.

24. The apparatus as in claim 22, wherein at least one processor is configured to adjust an order in which the log-off reasons are to be displayed at the agent station.

25. The apparatus as in claim 24, further comprising:
a report generator configured to report a record of log-off reasons actually selected; and
a work management system configured to utilize historical information from the report generator to provide requests to the at least one processor configured to adjust the order in which the log-off reasons are to be displayed.

26. The apparatus as in claim 24, the order in which the log-off reasons are to be displayed at the agent station being selected from a group consisting of: a same order for every agent, an individual order format least one agent, a group order for a group of agents, an order in which the reasons have been used most often by an agent to whom the set of reasons is to be displayed, an order in which the reasons have been used most often among a category of agents which includes the agent to whom the set of reasons is to be displayed, an order in which the reasons have been used most often among all agents working with the system, an order in which the reasons have been used most recently by the agent to whom the set of reasons is to be displayed, an order in which the reasons have been used most recently among a grouping of agents which includes the agent to whom the set of reasons is to be displayed, an order in which the reasons have been used most recently among all agents working with the system, an order correlated with scheduled activities of the agent to whom the set of reasons is to be displayed, an order specified by a person, an order specified by a software program facilitating scheduling of agent activities, and an order correlated with a time of the log-off request during a work shift of the agent to whom the set of reasons is to be displayed.

27. The apparatus as in claim 22, wherein at least one processor is configured to apply an algorithm for determining an order in which the log-off reasons are to be displayed at the agent station.

28. The apparatus as in claim 27, wherein identification of the algorithm to be applied is stored as an attribute of the set of agents.

29. The apparatus as in claim 22, wherein the memory is initialized with a default list of log-off reasons.

30. The apparatus as in claim 22,
wherein sending the list of log-off reasons to the agent station is an optional event; and
wherein the at least one processor configured to send the list is configured to send the list only if the event is activated.

31. The apparatus as in claim 22, wherein the at least one processor, configured to send the list of log-off reasons to the agent station, is configured to receive immediate notification when the list is changed and to update the list sent to the agent station if a log-off procedure for the agent station has not been completed.

32. The apparatus as in claim 22, further comprising a data terminal, wherein a log-off reason selected at the agent station can be monitored real-time by access to the data terminal.

33. The apparatus as in claim 22, further comprising a report generator configured to report a record of log-off reasons actually selected.

34. The apparatus as in claim 22, wherein at least one processor is configured to compare a log-off reason selected at the agent station with a scheduled activity of an agent identified as working at the agent station.

\* \* \* \* \*

UNITED STATES PATENT AND TRADEMARK OFFICE
CERTIFICATE OF CORRECTION

PATENT NO. : 6,654,798 B1 Page 1 of 1
DATED : November 25, 2003
INVENTOR(S) : Skibinski et al.

It is certified that error appears in the above-identified patent and that said Letters Patent is hereby corrected as shown below:

Column 1,
Line 65, "logon/log-off" should read -- log-on/log-off --.

Column 2,
Line 46, "connection," should read -- connection --.

Column 3,
Line 55, "2;" should read -- 2, --.

Column 4,
Lines 36-37, "deleted o from" should read -- deleted from --;
Line 48, "the,example" should read -- the example --.

Column 5,
Line 9, "at" should read -- an --;
Line 39, "a'specified" should read -- a specified --.

Column 6,
Line 12, "52 and" should read -- 52, and --.

Column 7,
Line 9, "note" should read -- not, --;
Line 39, "rand," should read -- and, --.

Column 11,
Line 18, "format" should read -- for at --.

Signed and Sealed this

Third Day of February, 2004

JON W. DUDAS
*Acting Director of the United States Patent and Trademark Office*